(12) United States Patent
Aultman et al.

(10) Patent No.: US 6,428,018 B1
(45) Date of Patent: Aug. 6, 2002

(54) CHUCK

(75) Inventors: William H. Aultman, Pickens; Robert A. Grogan, Salem, both of SC (US)

(73) Assignee: Power Tool Holders Incorporated, Christiana, DE (US)

(*) Notice: Subject to any disclaimer, the term of this patent is extended or adjusted under 35 U.S.C. 154(b) by 0 days.

(21) Appl. No.: 09/523,426

(22) Filed: Mar. 10, 2000

(51) Int. Cl.[7] .............................................. B23B 31/12
(52) U.S. Cl. ........................... 279/61; 279/60; 279/140; 279/902
(58) Field of Search .............................. 279/60–65, 140, 279/902; 411/438

(56) References Cited

U.S. PATENT DOCUMENTS

| | | | |
|---|---|---|---|
| 299,909 A | 6/1884 | Church | |
| 323,179 A | * 7/1885 | Mason | 279/61 |
| 562,421 A | 6/1896 | Richards | |
| 722,575 A | 3/1903 | Gates | |
| 813,864 A | 2/1906 | Coit | |
| 1,188,532 A | 6/1916 | Cobey | |
| 1,509,061 A | 9/1924 | Hardwicke | |
| 1,764,291 A | * 6/1930 | Emrick | 279/61 |
| 2,550,871 A | * 5/1951 | Sharp | 279/61 |
| 2,581,399 A | * 1/1952 | Forster | 411/438 |
| 4,097,054 A | 6/1978 | Derbyshire | |
| 4,103,914 A | 8/1978 | Rohm | |
| 4,302,021 A | 11/1981 | Rohm | |
| 4,660,841 A | 4/1987 | Chouinard | 279/61 |
| 4,695,066 A | 9/1987 | Rohm | 279/62 |
| 4,989,887 A | 2/1991 | Jordan | |
| 5,054,796 A | 10/1991 | Rohm | |
| 5,215,317 A | 6/1993 | Jordan et al. | |
| 5,232,230 A | 8/1993 | Lin | |
| 5,324,050 A | 6/1994 | Kanaan | |
| 5,499,828 A | 3/1996 | Salpaka | |
| 5,499,830 A | 3/1996 | Schnizler | |
| 5,503,409 A | 4/1996 | Rohm | |
| 5,511,801 A | 4/1996 | Kanaan et al. | |
| 5,531,461 A | 7/1996 | Huff et al. | |
| 5,704,616 A | 1/1998 | Huff et al. | |
| 5,775,704 A | 7/1998 | Wilson et al. | |
| 5,944,327 A | 8/1999 | Kanaan | |
| 6,129,363 A | * 10/2000 | Mack | 279/62 |

\* cited by examiner

Primary Examiner—Steven C. Bishop
(74) Attorney, Agent, or Firm—Nelson Mullins Riley & Scarborough, LLP

(57) ABSTRACT

A chuck includes a generally cylindrical body having a nose section and a tail section. A plurality of jaws are movably disposed with respect to the body to and away from the chuck's axial bore. A generally cylindrical sleeve is in driving communication with the jaws. The sleeve engages the body or the jaws by a first set of interengaged threads so that relative rotation between the first threads drives the jaws toward or away from the chuck axis. The sleeve engages the body or the jaws by a second set of interengaged threads so that relative rotation between the second threads drives the jaws toward or away from the chuck axis. The first thread set defines a first pitch so that when the jaws close, the first threads rotationally lock in the closing direction. The second thread set defines a second pitch that is higher than the first pitch so that when the jaws close, the second threads are relatively rotatable in the closing direction.

27 Claims, 11 Drawing Sheets

CHUCK

BACKGROUND OF THE INVENTION

The present invention relates generally to chucks for use with drills or with electric or pneumatic power drivers. More particularly, the present invention relates to a chuck of the keyless type which may be tightened or loosened by hand or by actuation of the driver motor.

Both hand and electric or pneumatic tool drivers are well-known. Although twist drills are the most common tools used with such drivers, the tools may also comprise screwdrivers, nut drivers, burrs, mounted grinding stones, and other cutting or abrading tools. Since the tools may have shanks of varying diameter or may have a polygonal cross-section, the device is usually provided with a chuck that is adjustable over a relatively wide range. The chuck may be attached to the driver by a threaded or tapered bore.

A wide variety of chucks have been developed in the art. In one form of chuck, three jaws spaced circumferentially approximately 120° apart from each other are constrained by angularly disposed passageways in a body attached to the driveshaft. The chuck is configured so that rotation of the body in one direction with respect to a constrained nut forces the jaws into or away from gripping relationship with a tool shank. Such a chuck may be keyless if it can be tightened or loosened by manual rotation. Examples of such chucks are disclosed in U.S. Pat. Nos. 5,125,673 and 5,193,824, commonly assigned to the present assignee and the entire disclosures of which are incorporated by reference herein. Various configurations of keyless chucks are known in the art and are desirable for a variety of applications.

FIG. 2 illustrates, in cross-section, a typical chuck jaw construction in which each of three jaws 200 includes a back surface 202 and an opposing tool-engaging surface formed by a ridge 204 disposed generally parallel to the chuck axis. Two generally planar side surfaces 206 extend from ridge 204 to the back surface. The side surfaces on each jaw 200 define a 120° angle δ extending through the jaw. Thus, each side surface on a jaw 200 is parallel to a side surface of an adjacent jaw. When the chuck is moved to its fully closed position as shown in FIG. 2, the jaw side surfaces abut each other.

Other tool-engaging surfaces are known. For example, the tool-engaging surface may be formed by an inner ridge parallel to the chuck axis and two outer ridges parallel to the inner ridge. A pair of respective troughs sit between the inner ridge and the outer ridges so that the jaw's cross-section is in the shape of a W. Generally, side surfaces that extend from the outer ridges to the jaw's back surface define a 120° angle between them through the jaw so that each side surface is parallel to the side surface of its adjacent jaw.

SUMMARY OF THE INVENTION

The present invention recognizes and addresses disadvantages of prior art construction and methods.

Accordingly, it is an object of the present invention to provide an improved chuck for use with a powered driver.

This and other objects are achieved by a chuck for use with a manual or powered driver having a rotatable drive shaft. The chuck includes a generally cylindrical body having a nose section and a tail section. The tail section is configured to rotate with the drive shaft. The nose section has an axial bore formed therein. A plurality of jaws are moveably disposed with respect to the body to and away from the axial bore. A generally cylindrical sleeve is in driving communication with the jaws so that rotation of the sleeve with respect to the body in a closing direction moves the jaws toward the chuck axis and so that rotation of the sleeve with respect to the body in an opening direction moves the jaws away from the chuck axis. The chuck includes a first set of interengaged threads by which the sleeve engages one of the body and the jaws so that relative rotation between the first threads drives the jaws toward or away from the chuck axis. The chuck includes a second set of interengaged threads by which the sleeve engages one of the body and the jaws so that relative rotation between the second threads drives the jaws toward or away from the chuck axis. The first thread set defines a first pitch so that when the jaws close, the first threads rotationally lock in the closing direction. The second thread set defines a second pitch that is higher than the first pitch so that when the jaws close, the second threads are relatively rotatable in the closing direction.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
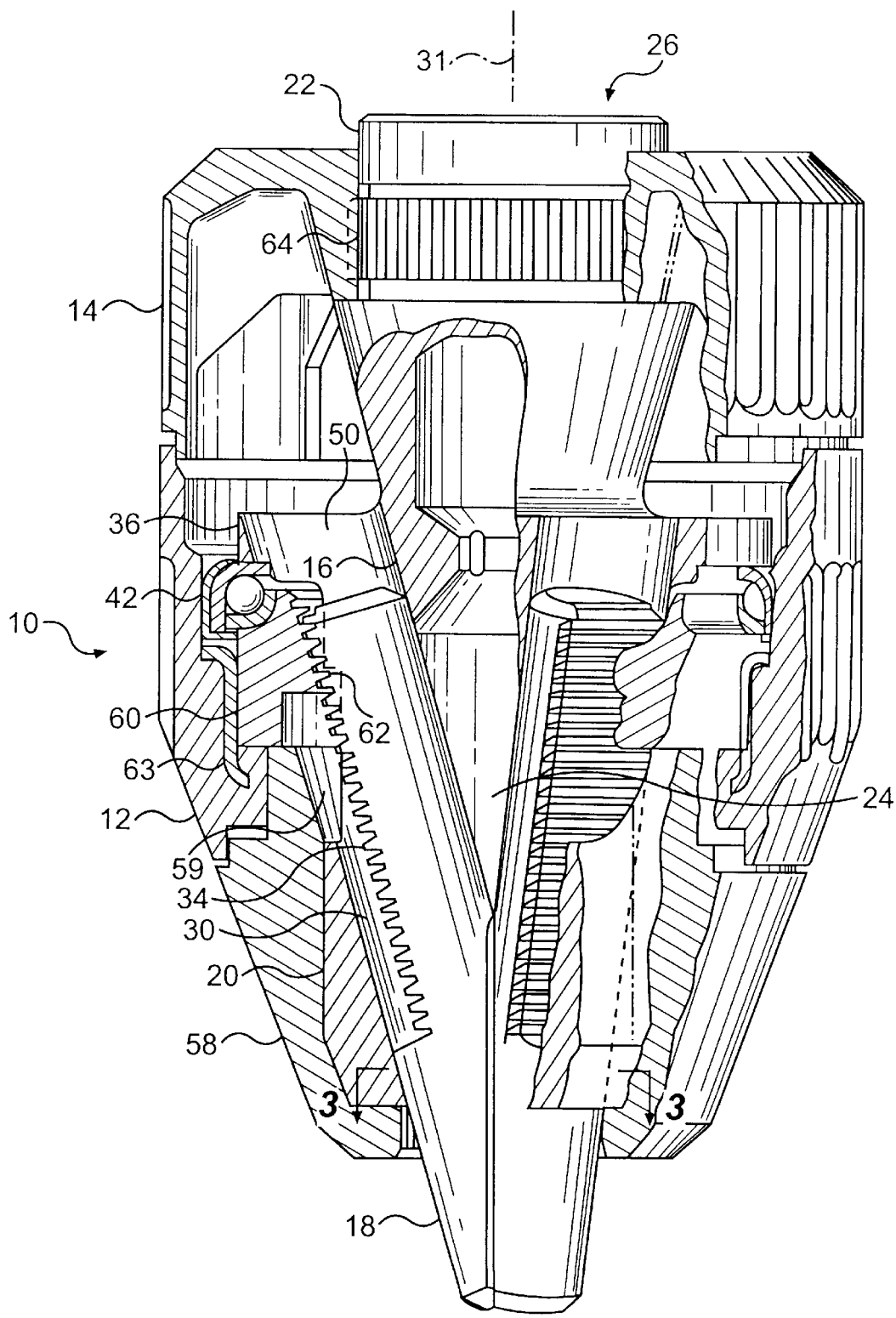
FIG. 1 is a plan view partly in section, of a chuck constructed in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawing. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring to FIG. 1, a chuck 10 includes a front sleeve 12, an optional rear sleeve 14, a body 16 and jaws 18. Body 16 is generally cylindrical in shape and includes a nose or forward section 20 and a tail or rearward section 22. An axial bore 24 is formed in nose section 20 and is somewhat larger than the largest tool shank that the chuck is designed to accommodate. A threaded bore 26 is formed in tail section 22 and is of a standard size to mate with the drive shaft of a powered or hand driver (not shown). The bores 24 and 26 may communicate at a central region of body 16. While a threaded bore 26 is described, such bore may be replaced with a tapered bore of a standard size to mate with a tapered drive shaft. Furthermore, the body may be formed integrally with the drive shaft.

A plurality of passageways 30 are formed in body 16 to accommodate each jaw 18. Preferably, three jaws 18 are employed, and each jaw is separated from the adjacent jaw by an arc of approximately 120°. The axes of passageways 30 and jaws 18 are angled with respect to the chuck axis 31 but intersect the axis at a common point ahead of chuck body 16. Each jaw 18 has a tool engaging surface that is generally parallel to the axis of axial bore 24, which is axis 31 of chuck body 16. Each jaw 18 also defines threads 34 on its opposite or back surface.

Body 16 includes a thrust ring 36 which may be integral with the body. Thrust ring 36 includes a forward face that may include a seating surface for engagement with the inner race of a self-contained antifriction bearing assembly 42. Bearing assembly 42 may comprise any suitable construction, for example a bearing assembly of the type described in U.S. Pat. No. 5,348,318, incorporated by reference herein. Thrust ring 36 includes a plurality of jaw guideways 50 formed around its circumference to permit retraction of jaws 18.

A nut 60 includes threads 62 for mating with threads 34 on jaws 18 whereby when the nut is rotated with respect to the body, the jaws are advanced or retracted in the jaw passageways. Front sleeve 12 includes a metal annular collar 63 that is co-molded with the sleeve and that is pressed onto the nut so that the nut rotates with the sleeve. It should be understood that various sleeve and nut configurations may be employed. For example, sleeve 12 may be pressed onto nut 60 without collar 63. Furthermore, while a one-piece nut is illustrated, a two-piece nut configuration may be used in conjunction with a collar 63 where the chuck body receives a two-piece nut within an annular groove. Still further, sleeve 12 may be loosely fitted over body nose section 20 and may include drive ribs that engage drive slots in the nut so that the front sleeve rotationally drives the nut.

Returning to FIG. 1, a nosepiece 58 is pressed onto nose section 20 of body 16 to maintain nut 60 axially in position. Since sleeve 12 is pressed onto nut 60, nosepiece 58 also retains sleeve 12 in position. Nosepiece 58 defines a rear frustoconical surface 59 to allow passage of jaws 18 rearward of body passageways 30. While nosepiece 58 is pressed onto body 16 as shown in FIG. 1, it should be appreciated that the nosepiece could also be secured by snap fit, threading or the like. Nosepiece 58 is exposed when the chuck is assembled and is preferably coated with a non-ferrous metallic coating to prevent rust and to enhance its appearance.

Tail section 22 of body 20 can include a rear cylindrical portion having a knurled surface 64 thereon for receipt of rear sleeve 14. The rear sleeve may be pressed onto the knurled surface or could be retained in place by press fit without knurling or by use of a key. It could also be retained by crimping, staking, riveting, threading or any other suitable securing mechanism. Where front and rear sleeves 12 and 14 are replaced by a single sleeve extending substantially the length of body 16, a retaining disk may be pressed or otherwise retained on the tail section to maintain the sleeve on the body in the rearward direction.

The outer circumferential surface of sleeve 12 may be knurled or may be provided with longitudinal ribs or other protrusions to enable the operator to grip it securely. In like manner, the circumferential surface of rear sleeve 14, if employed, may be knurled or ribbed if desired. The front and rear sleeves may be fabricated from a structural plastic such a polycarbonate, a filled polypropylene, for example glass-filled polypropylene, or a blend of structural plastic materials. Other composite materials such as, for example, graphite filled plymerics could also be suitable in certain environments. Further, the sleeves may be constructed from suitable metals, such as steel. As would be appreciated by one skilled in the art, the materials from which the chuck of the present invention is fabricated may depend upon the end use of the chuck, and the above are provided by way of example only.

Figure 3:
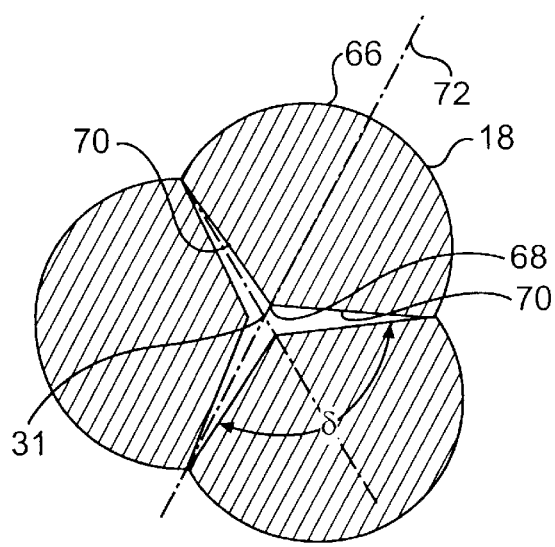
FIG. 3 is a cross-sectional view of jaws for use in a chuck constructed in accordance with an embodiment of the present invention.

FIG. 3 provides a cross-sectional illustration of jaws 18 along the lines 3—3 as shown in FIG. 1. Each jaw includes a back surface 66 and a tool-engaging surface defined by a ridge 68 parallel to chuck axis 31. Each jaw includes two side surfaces 70 that extend from the jaw's tool-engaging ridge 68 to its back surface 66. Each jaw's side surfaces 70 are disposed symmetrically on either side of a plane 72 that includes chuck axis 31 and the jaw's tool-engaging ridge 68. That is, plane 72 evenly splits the angle between a jaw's side surfaces. Each side surface is generally planer. That is, a side surface may incidentally deviate from an ideal plane such that the side surface would not typically bite into a tool shank.

Where chuck 10 includes three jaws, side surfaces 70 of each jaw 18 define an angle $\delta$ through the chuck that is greater than 120°. Where the chuck includes a different number of jaws, the angle is greater than 360° divided by that number. Accordingly, side surfaces 70 are not parallel to side surfaces of their adjacent jaws and do not fully abut those side surfaces is when the chuck is in a fully closed position as shown in FIG. 3.

Because opposing side surfaces 70 of adjacent jaws 18 diverge from each other from jaw back surfaces 66 to the tool-engaging surfaces, a tool shank that is placed into the chuck bore, but that is offset from chuck axis 31 so that it sits between opposing side surfaces, tends to be pushed back toward the chuck center axis as the jaws close. This is particularly advantageous in a fast-closing chuck as described below.

The magnitude of angle $\delta$ may depend on the chuck's construction. For example, chucks having a nose section axial bore within a range of approximately 10 millimeters in diameter to 13 millimeters in diameter may have jaws with side surfaces that define an angle δ within a range of 130° to 140°. In two exemplary embodiments, jaws of a chuck having a 10 mm capacity define side surface angles δ of approximately 130°, and jaws of a chuck having a 13 mm capacity define angles δ of approximately 136°. When the jaws of the 10 mm chuck fully close on each other, their ridges 68 define a circle of approximately 1 mm diameter. Thus, the jaws are able to securely hold tool shanks larger than 1 mm. The corresponding diameter for the 13 mm chuck is approximately 1.5 mm. Angle δ may vary from 130° and 140° for these type chucks, depending on the minimum diameter tool shank the chuck must grip. Angle δ may also vary with the chuck axial bore diameter, for example ranging from 125° to 145° for exemplary chucks slightly smaller than 10 mm in capacity and slightly larger than 13 mm in capacity, respectively.

Figure 4:
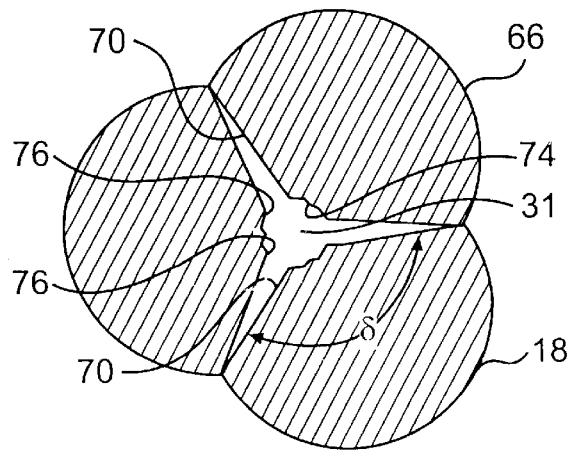
FIG. 4 is a cross-sectional view of jaws for use in a chuck constructed in accordance with an embodiment of the present invention.

It should be understood that various tool-engaging surfaces may be used on the jaws. For example, referring to FIG. 4, the tool-engaging surface of each jaw 18 includes an inner ridge 74 and two outer ridges 76 disposed parallel to chuck axis 31. Each outer ridge 76 is separated by a trough from inner ridge 74 so that the tool-engaging surface defines a W-shaped cross-section. As shown in FIG. 4, angle δ between each pair of side surfaces 70 is greater than 120°. In still further embodiments, the planar side surfaces do not necessarily extend entirely back to the jaw back surface.

It should also be understood that jaws as described herein may be used with a variety of chuck configurations. For example, referring to FIGS. 5 and 6, a chuck 110 having jaws 18 as described above with respect to FIGS. 3 and 4 includes a front sleeve 114, an optional rear sleeve 116 and a plurality of jaws 18. A body 120 is generally cylindrical in shape and includes a nose or forward section 122 and a tail or rearward section 124. An axial bore 126 is formed in the nose section and is somewhat larger than the largest tool shank that the chuck is designed to accommodate. As should be understood in this art, body 120 may be formed from steel bar stock or any other suitable material.

Body 120 defines a threaded bore 128 in its tail section. Bore 128 is of a standard size to mate with the drive shaft of a powered or hand driver. While a threaded bore 128 is illustrated, such bore could be replaced with a tapered bore of a standard size to mate with a tapered drive shaft. Furthermore, tail section 124 may be formed integrally with the drive shaft. The bores 126 and 128 may communicate at a central region 130 of body 120. Central region 130 may be formed with a socket to accept a drive bit so that the body may be screwed onto the spindle by the bit. Such a socket configuration is described in the '824 patent incorporated by reference above.

Body 120 also defines three passageways 132 to respectively accommodate the three jaws. In a three-jaw configuration, each passageway, and therefore each jaw, is separated from each adjacent passageway by an arc of approximately 120°. The longitudinal axes of the passageways 132 and the jaws 18 are angled with respect to the chuck's longitudinal axis 112 but intersect the chuck axis at a common point ahead of chuck body 120.

Figure 5:
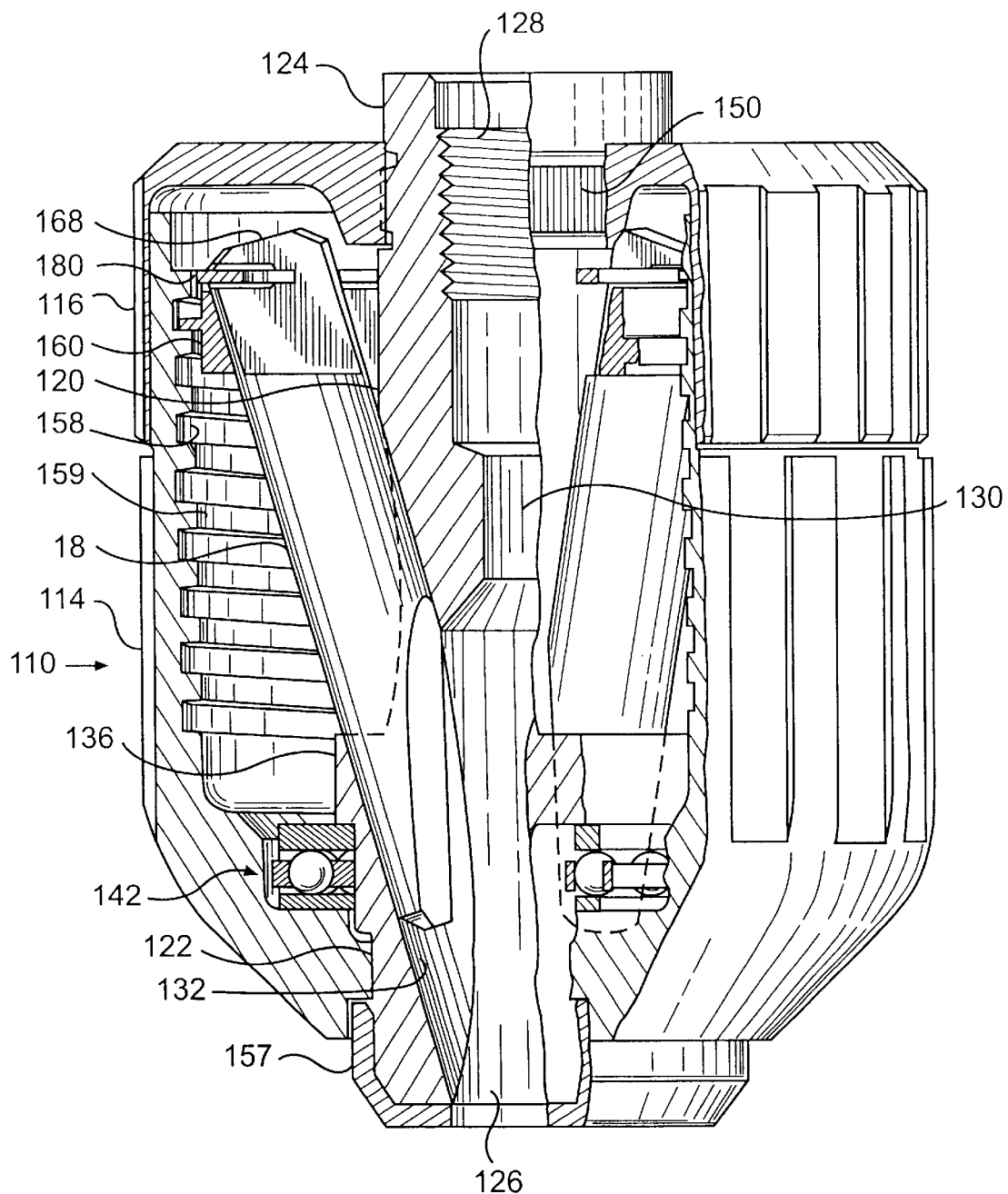
FIG. 5 is a plan view, partly in section, of a chuck constructed in accordance with an embodiment of the present invention.

Body 120 also includes a thrust ring member 136, which in a preferred embodiment forms an integral part of the body. Although not presently preferred, the thrust ring may be a separate component from the body's main portion. As shown in FIG. 5, thrust ring 136 includes a ledge portion that receives a bearing assembly 142. The bearing assembly includes a bearing cage 144 and a pair of washers on either side of the cage. Bearing assembly 142 may comprise any suitable construction, for example a bearing assembly of the type described in the '318 patent incorporated by reference above.

Tail section 124 can include a rear cylindrical portion having a knurled surface 156 thereon for receipt of rear sleeve 116. The rear sleeve may be pressed onto the knurled surface or could be retained in place by press fit without knurling or by use of a key. It could also be retained by crimping, staking, riveting, threading or any other suitable mechanism. Where front and rear sleeves 114 and 116 are replaced by a single sleeve extending substantially the length of body 120, a retaining disk may be pressed or otherwise retained on the tail section to maintain the sleeve on the body in the rearward direction. The sleeves may be made from any suitable material, for example as described above.

Nose section 122 is beveled and is adapted to receive a nose piece 157 for restraining front sleeve 114 from forward axial movement with respect to the chuck body. Alternatively, a snap ring or other suitable mechanism may be used to axially restrain the sleeve. Nose piece 157 may be pressed onto nose section 122 or attached in any other suitable manner. Rearward axial movement of the sleeve on the body is prevented by thrust ring 136 through bearing assembly 142.

The front sleeve's interior surface 159 defines female threads 158. The threads are a modified square thread formation in an eight pitch configuration along the length of sleeve 114. It should be understood, however, that any suitable thread shape or formation may be employed, for example including a modified buttress thread. Thus, the squared interfaces between the outer surface and the back side and/or front side of thread 158 may be replaced by a curved interface.

A nut 160 includes a male thread 162 extending about an outer circumferential surface 164. Thread 162 has the same pitch as thread 158 so that when thread 162 is received by thread 158, relative rotation between sleeve 114 and nut 160 moves the nut axially within the sleeve. In particular where the nut is molded, thread 162 may have sloped sides, for example at an approximately 5° slope, extending from surface 164 to the threads' outer diameter.

Nut 60 includes three equiangularly spaced apart slots 166 extending axially through the nut and receiving respective end sections 168 of jaws 18 therethrough. Each end section has a generally rectangular cross-section that corresponds to the cross-section of its slot 166 so that the slot slidably receives the jaw end section but prevents rotation of the jaw about the jaw's axis.

Each end section 168 defines a slot 176 extending generally radially into the end section. The end sections extend through the slots 166 so that the slots 176 are rearward of and parallel to the rear face of nut 160.

Each slot 176 receives a respective elongated spring arm 180 that extends inward from and generally circumferentially within a steel back ring 182. Arms 180 bias their distal ends radially inward with respect to back ring 182. Thus, spring arms 180 grip the jaw end sections to restrain rotation of ring 182 about chuck axis 112 when jaws 18 are received in slots 132. Furthermore, arms 180 axially fix ring 182 with respect to the jaws.

Figure 6:
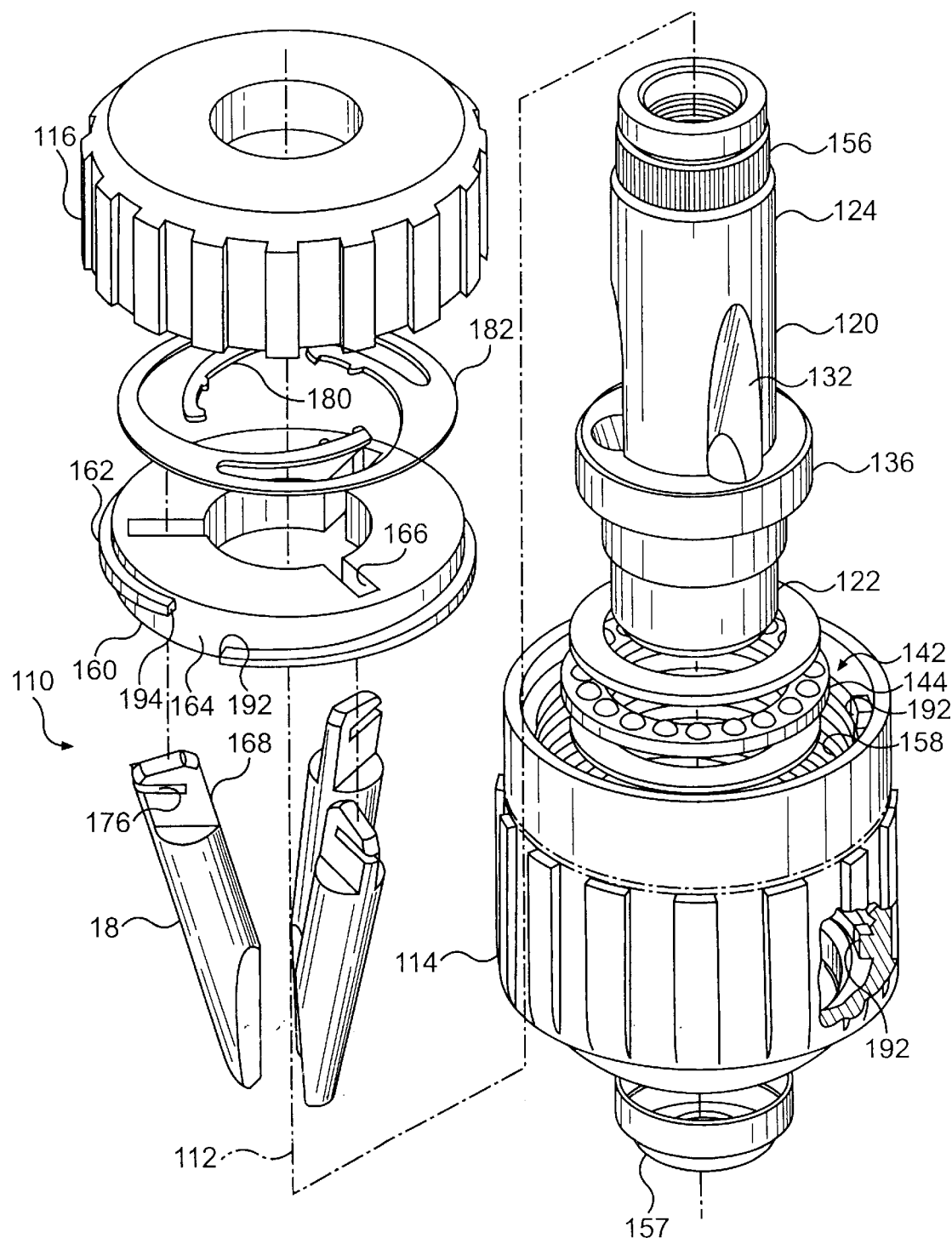
FIG. 6 is an exploded view of the chuck as shown in FIG. 5.

As apparent from FIGS. 5 and 6, jaws 18 are unable to pass rearwardly through nut 160, and ring 182 restrains the jaws from moving in the forward axial direction with respect to the nut. Furthermore, the jaws pass through both nut slots 166 and body slots 132, thereby rotationally securing the nut with respect to the body. Since the nut cannot rotate with respect to the body, rotation of sleeve 114 with respect to the body moves nut 160 axially with respect to chuck axis 112 by the cooperation between threads 162 and 158. Depending on the sleeve's rotational direction, the nut moves axially forward or backward on the body to move jaws 18 axially in slots 132 to an open or closed position.

Spring arms 180 help to maintain the jaws in an aligned position in passageways 132. It should be understood, however, that any suitable mechanism may be used to retain the jaws axially within the jaw passageways. For example, back ring 182 may be replaced by a garter spring or any other suitable retainer, such as an expandable polymer collar, that applies a radially inward force to jaw end sections 168. Alternatively, the nut may be formed with T-shaped slots or cylindrical bores instead of slots 166. Each of three equiangularly spaced T-shaped or cylindrical slots extends radially into the nut and may extend entirely through the nut. Jaw end sections 168 are formed in a corresponding T-shape or semicircle-shape so that the slots slidably receive the respective jaw ends. The slots allow the jaw ends to move radially as the nut moves the jaws between open and closed positions. A dry lubricant coating may be provided on the jaw ends and/or nut slots to facilitate this movement. The cooperation between the jaw ends and the nut slots maintains the jaws at the proper angle with respect to the nut so that the jaws are maintained in alignment with the jaw passageways in the assembled chuck.

In still another preferred embodiment, a guide ring may be pressed onto thrust ring 136. Three equiangularly spaced prongs extend rearwardly from the ring against respective jaws 18 rearwardly of jaw passageways 132, thereby maintaining the jaws in axial alignment with the passageways. Back ring 182, a garter spring, or a nut-slot configuration may be used in conjunction with the guide ring.

Rotation of sleeve 114 clockwise, when viewed from nose section 122, moves nut 160 axially forward with respect to chuck axis 112, thereby moving jaws 18 to a closed position. Conversely, counterclockwise rotation of the front sleeve moves the jaws in an opening direction. A stop 192 is provided at the rear edge of thread 158. When the jaws reach a fully opened position, a rear edge 194 of thread 162 abuts stop 192. This prevents further rotation of the sleeve with respect to the nut and thereby prevents the jaws from binding in the chuck's rear area. A similar stop 196 is provided at the front end of thread 158 to stop a forward edge 198 of thread 162 to prevent the jaws from binding in the fully closed position when there is no tool in the chuck bore.

Thread 162 defines one turn around surface 164 of nut 160. A gap between thread edges 194 and 198 has an angular width greater than the width of stop 192. This facilitates the chuck's assembly in that the nut may be placed directly down onto thread 158 over the stop. Rear sleeve 116 then prevents the nut from disengaging from the front sleeve when the chuck is in a fully opened position.

Figure 7:
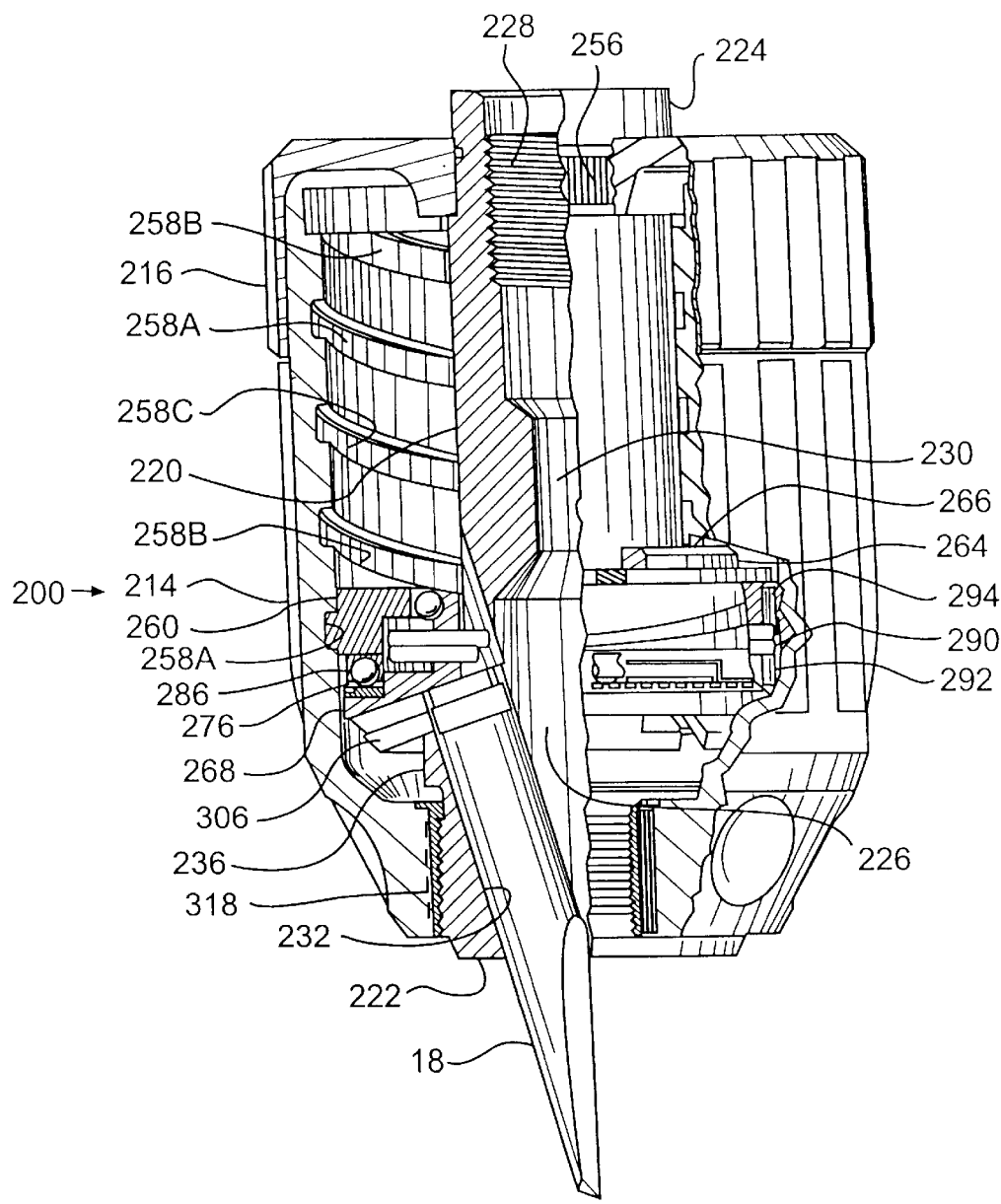
FIG. 7 is a plan view, partly in section, of a chuck in accordance with an embodiment of the present invention.
Figure 10:
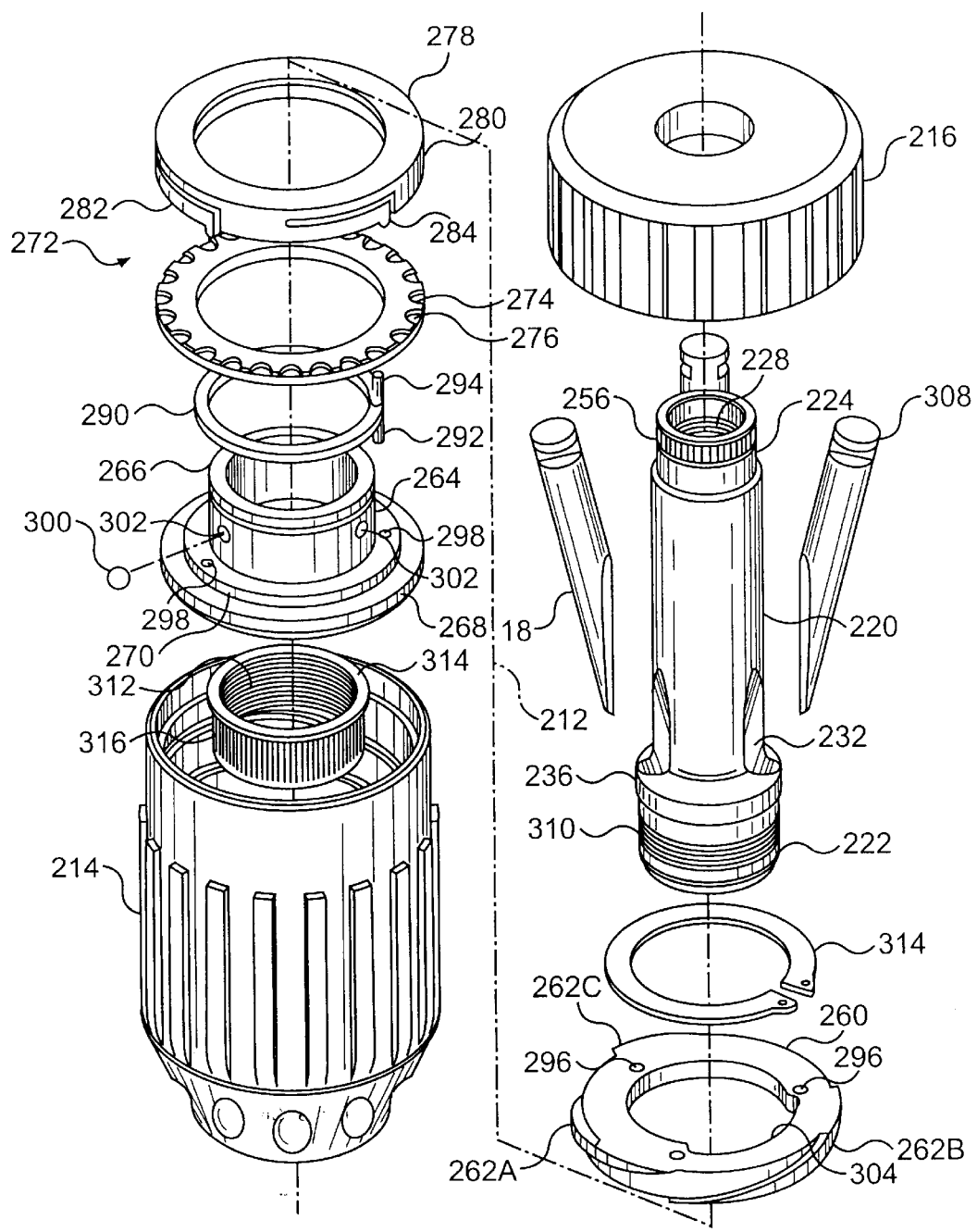
FIG. 10 is an exploded view of the chuck as in FIG. 7.

Referring now to FIGS. 7 and 10, jaws 18 may also be included in a fast-closing chuck 200 having a front sleeve 214, an optional rear sleeve 216 and three jaws 18. A body 220 is generally cylindrical in shape and includes a nose or forward section 222 and a tail or rearward section 224. An axial bore 226 is formed in the nose section and is somewhat larger than the largest tool shank that the chuck is designed to accommodate.

Body 220 defines a threaded bore 228 in its tail section. As noted above, bore 228 may be a tapered bore of a standard size to mate with a tapered driveshaft. Furthermore, body 220 may be integrally formed with the driveshaft. The bores 226 and 228 may communicate at a central region 230 of body 220. Central region 230 may be formed with a socket to accept a drive bit so that the body may be screwed onto the spindle by the bit.

Body 220 also defines three passageways 232 to respectively accommodate the three jaws 18. In a three-jaw configuration, each passageway, and therefore each jaw, is separated from each adjacent passageway by an arc of approximately 120°. The longitudinal axes of the passageways 232 and the jaws 18 are angled with respect to the chuck's longitudinal axis 212 but intersect the chuck axis at a common point ahead of chuck body 220.

Body 220 includes a thrust ring 236, which may be integrally formed with or separate from the body's main portion.

Tail section 224 can include a rear cylindrical portion having a knurled surface 256 thereon for receipt of rear sleeve 216. The rear sleeve may be pressed onto the knurled surface or could be retained in place by press fit without knurling or by use of a key. It could also be retained by crimping, staking, riveting, threading or any other suitable securing mechanism. Where front and rear sleeves 214 and 216 are replaced by a single sleeve extending substantially the length of body 220, a retaining disk may be placed or otherwise retained on tail section 224 to maintain the sleeve on the body in the rearward direction.

The outer circumferential surface of sleeve 214 may be knurled or may be provided with longitudinal ribs or other protrusions to enable the operator to grip it securely. In like manner, the circumferential surface of rear sleeve 216, if employed, may be knurled or ribbed if desired. The front and rear sleeves may be fabricated from a suitable material such as described above.

The interior surface of sleeve 214 defines three female threads 258A, 258B and 258C. The threads are a square thread formation. Nut 260 includes three male threads 262A, 262B and 262C that are received in threads 258A, 258B and 258C, respectively. As described in more detail below, nut 260 is rotationally fixed to body 220. Accordingly, rotation of sleeve 214 about the body drives nut 260 axially within the sleeve. Sleeve threads 258A, 258B and 258C and nut threads 262A, 262B and 262C provide a one pitch configuration along the length of sleeve 214 in that one complete relative rotation between sleeve 214 and nut 260 moves the nut approximately one inch axially within the sleeve.

Three female threads and three male threads are used to permit a relatively narrow nut. That is, it is preferable that the nut thread extends substantially entirely about the nut's outer circumference so that the nut remains balanced during the chuck's operation. Where a single female/male thread pair is used, the male thread about the nut's circumference would require that the nut be longer in the axial direction than where the three-thread configuration is used. Nevertheless, it should be understood that the present invention encompasses other thread configurations, for example one-thread, two-thread and four-thread arrangements.

Nut 260 is slidably received over a body portion 264 of a thrust plate 266. A flange 268 extends radially outward from plate body 264 and defines a ledge 270 upon which a bearing assembly 272 is received. Bearing assembly 272 includes a first race 274 having recesses 276 defined about the radially outward edge of its rearward face. An opposite race 278 includes a shroud 280 extending axially forward therefrom. The shroud defines a plurality of spring arms 282 biased axially forward toward washer 274 so that tabs 284 defined at the distal ends of arms 282 engage respective recesses 276. When, as described below, nut 262 rotates with respect to thrust plate 266, frictional forces between washer 274 and thrust plate 266 and between washer 278 and nut 260 overcome the link between washers 278 and 274 provided by the engagement of tabs 284 in recesses 276. Thus, spring arms 282 are deflected so that each tab 284 moves out of its recess 276 and into the next recess. Continued rotation of nut 260 with respect to the thrust plate moves tabs 284 in and out of successive recesses, creating a clicking sound notifying the user that the chuck is approaching a fully closed position.

In another embodiment, washer 274 includes radially aligned recesses in its rearward face so that each of bearing balls 286 is received in a respective recess. Spring arms 282 are omitted. When relative rotation between nut 260 and thrust plate 266 causes relative rotation between washers 278 and 274, each ball 286 rolls out of its recess into the next recess. Continued rotation continues movement of the balls through successive recesses, causing a clicking sound that notifies the operator that the chuck is approaching a fully tightened position as described below.

Nut 260 is held rotationally with respect to thrust plate 266 by a torsion spring 290. Torsion spring 290 includes ends 292 and 294 that are received in opposing holes 296 and 298, respectively.

A detent ball 300 is received in any of three depressions 302 in thrust plate body section 264, depending on the holes 296 and 298 that receive the torsion spring ends, so that ball 300 is received in a groove 304 in the inner diameter of nut 260. Ball 300 provides a stop against the edges of groove 304, thereby limiting the range over which nut 260 can rotate with respect to the thrust plate. During normal operation before the chuck closes onto a tool shank, ball 300 preferably sits against a side of groove 304 so that, when the chuck closes onto a tool shank, rotation of nut 260 is permitted through the full angular width of groove 304. It should be understood that the length of groove 304 may be modified as desired to permit a greater degree of rotational movement of nut 260 with respect to thrust plate 266. For example, in one preferred embodiment, the angular width of groove 304 is approximately 240°.

Figure 11:
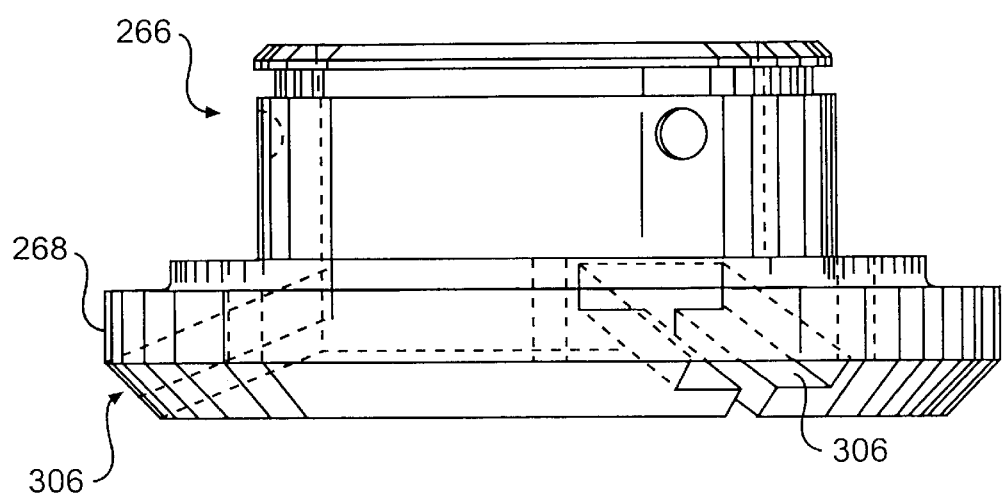
FIG. 11 is a plan view of a thrust plate for use in the chuck as in FIG. 7.

Referring also to FIG. 11, thrust plate 266 includes three equiangularly spaced apart radial slots 306 that are generally T-shaped. An end portion 308 of each jaw 18 is formed in a cooperating T-shape so that slots 306 slideably receive the respective jaws. The slots allow the jaw ends to move radially as the thrust plate moves the jaws between open and closed positions. A dry lubricant coating may be provided on the jaw ends and/or slots 306 to facilitate this movement. The cooperation between the jaw ends and slots 306 maintains the jaws at the proper angle with respect to the thrust plate so that the jaws are maintained in alignment in the jaw passageways in the assembled chuck. Slots 306 may also be cylindrical in shape, for example as shown in the embodiment illustrated in FIG. 13, and each jaw end section 308 may be formed in a cooperating semi-circular shape so that slots 306 receive the respective jaws.

Referring again to FIGS. 7 and 10, body nose section 222 includes threads 310 that engage threads 312 at a front end of sleeve 214. In the illustrated embodiment, threads 312 are formed about the inner surface of a metallic insert 314. The outer surface of insert 314 is knurled at 316 and is received at the forward end of sleeve 214 in a press fit at 318. Threads 310 and 312 form a secondary threaded tightening mechanism having a higher pitch than the primary threaded tightening mechanism formed between threads 258 and 262.

Figure 8:
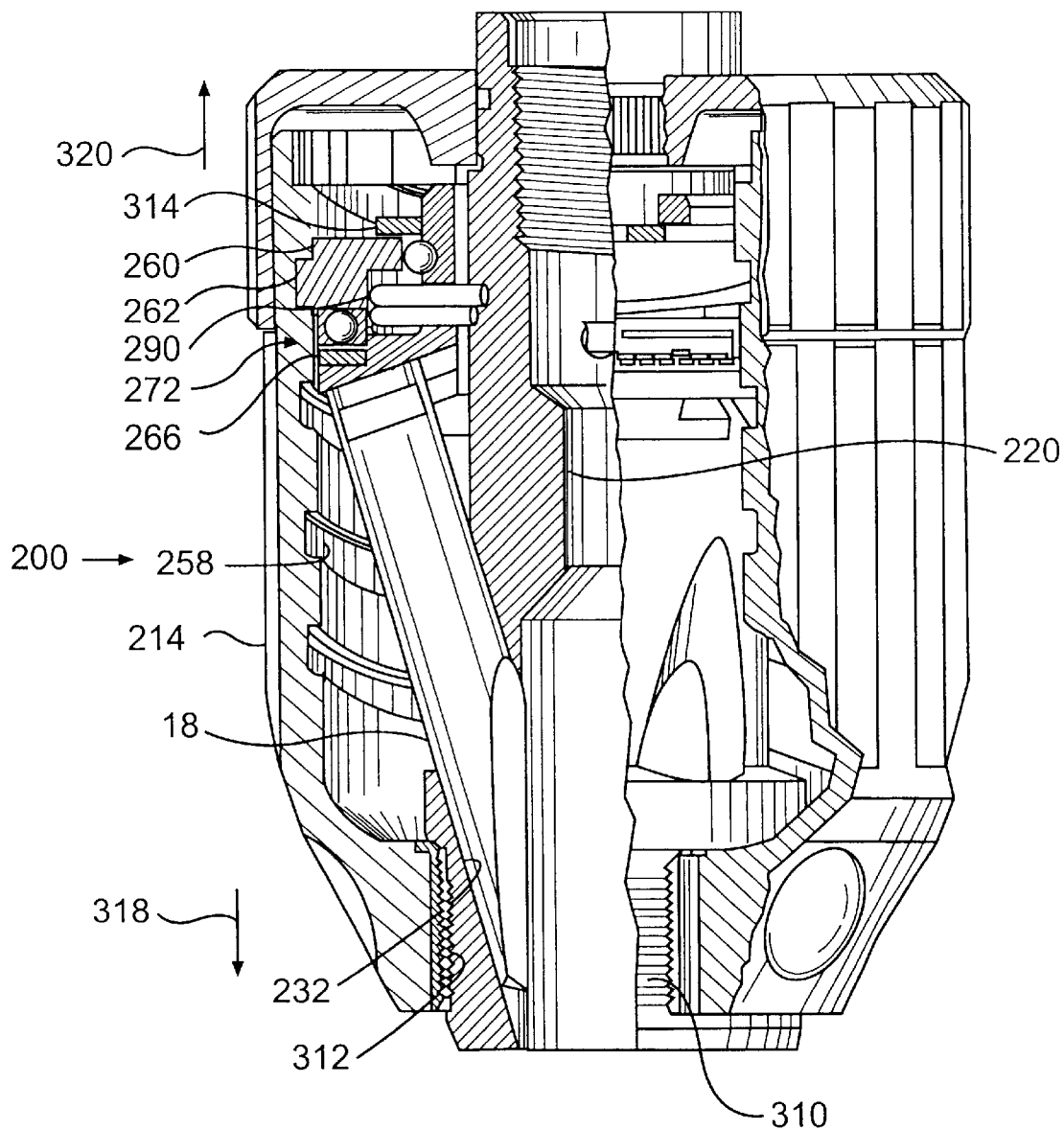
FIG. 8 is a plan view, partly in section, of the chuck as in FIG. 7.

Because jaws 18 are received in jaw passageways 232, the jaws are constrained from rotation about the chuck's axis. The receipt of jaw ends 308 by slots 306 rotationally holds thrust plate 266 with respect to chuck body 220. When the chuck is between its fully opened position and a fully closed position in which the chuck jaws are closed on each other or on a tool, friction between nut threads 262 and threads 258 is not sufficient to rotate nut 260 against the force of torsion spring 290. Thus, in operation and referring to FIG. 8, rotation of sleeve 214 in a clockwise direction (when viewed from the front of chuck 200) moves nut 260 axially forward with respect to the sleeve as indicated at arrow 318. Nut 260 presses forward against thrust plate 266 through bearing assembly 272, moving the bearing assembly forward with respect to body 220. Thrust plate 266, in turn, drives jaws 18 axially forward in their passageways 232, thereby moving the chuck toward a closed position. Rotation of sleeve 214 in the opposite direction moves nut 260 axially rearward with respect to the sleeve, as indicated by arrow 320. Since nut 260 is restrained in the axially rearward direction with respect to thrust plate 266 by a snap ring 314, the nut carries thrust plate 266 and jaws 18 axially rearward toward the chuck's open position. Accordingly, in both the opening and the closing directions, sleeve 214 axially drives the jaws through relative rotation between the sleeve and the nut. That is, the sleeve drivingly engages the jaws through threads 258 and 262.

Sleeve threads 312 also rotate about body threads 310 as sleeve 214 rotates. Threads 312 are in the opposite direction of thread 258, and threads 310 are in the opposite direction of thread 262. Thus, as sleeve 214 rotates in the closing (clockwise) direction, sleeve 214 moves on threads 310 axially forward with respect to the body in direction 318. When the sleeve is rotated in the opposite direction, the sleeve moves rearwardly on threads 310 in direction 320.

Accordingly, when sleeve 214 is rotated in the closing direction, nut 260 moves forward in direction 318 within the sleeve, while sleeve 214 simultaneously moves forward in direction 318 with respect to the body on body threads 310. Because threads 312 and 310 define a higher pitch than threads 258 and 262, nut 260 moves forward with respect to the sleeve faster than sleeve 214 moves forward with respect to the body. For example, in the one-pitch configuration illustrated in FIG. 8, approximately two full rotations of sleeve 214 are required to move nut 260 from its rearwardmost position with respect to the sleeve to its forwardmost position as shown in FIG. 7. In these two turns, sleeve 214 moves only $\frac{1}{16}^{th}$ inch forward on body 220.

Figure 9:
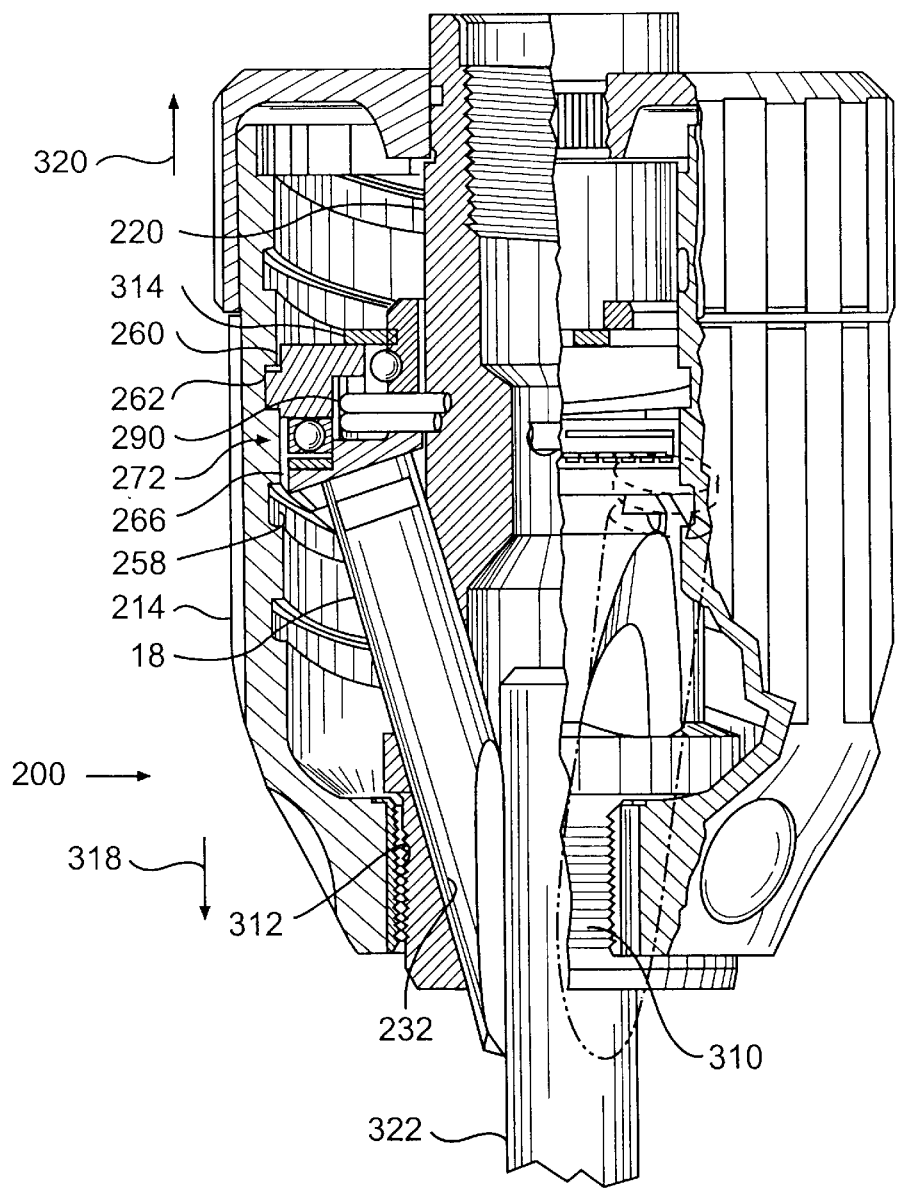
FIG. 9 is a plan view, partly in section, of the chuck as in FIG. 7.

Referring now to FIG. 9, when sleeve 214 is rotated such that jaws 18 close onto a tool shank 322, jaws 18, thrust plate 266 and nut 260 are unable to continue their forward axial movement. Accordingly, continued rotation of sleeve 214 tightens thread 258 against thread 262. The frictional force between threads 258 and 262 overcomes the resistance of torsion spring 290, and nut 260 rotates with sleeve 214 with respect to the thrust plate and the chuck body. This rotation carries sleeve 214 forward on body threads 310, thereby pressing nut 260 forward against thrust plate 266 through bearing assembly 272. The thrust plate, in turn, further presses jaws 18 down onto tool shank 322. As discussed above, rotation between nut 260 and thrust plate 266 produces a clicking sound from bearing 272 and is limited by the angular width of groove 304 in nut 260 (FIG. 10).

As threads 312 tighten onto threads 310, the forward force of sleeve 214 against nut 260 further tightens threads 258 and 262. When the operator releases sleeve 214, the sleeve and nut remain in their tightened rotational positions with respect to the chuck body.

Accordingly, chuck 200 includes a primary tightening mechanism and a secondary tightening mechanism. The primary tightening mechanism, threads 258 and 262, rapidly moves jaws 18 radially toward and away from the chuck axis. The low pitch of these threads, however, provides a relatively low mechanical advantage as the jaws tighten onto the tool. A higher advantage is supplied by the higher-pitch threads 312 and 310, and it is this secondary tightening that finally tightens jaws 18 onto the tool shank.

As indicated above, the primary thread is a one-pitch thread, and the secondary thread is a 32-pitch thread. It should be understood, however, that the pitch values, and the pitch ratio, can vary as suitable for the needs and construction of a given chuck. Generally, the primary pitch is such that the chuck opens and closes rapidly and rotationally locks in the closing direction when the jaws close on each other or a tool. That is, when the jaws close, a human operator is unable to relatively rotate the threads in the closing direction. The secondary thread pitch is such that when the jaws close, the threads provide sufficient mechanical advantage that the operator is able to continue relative rotation in the closing direction.

To open the chuck, the operator rotates sleeve 214 in the opening direction. Sleeve 214 moves axially rearward in direction 320 with respect to chuck body 220 on threads 310. This releases the wedge between threads 258 and 262, thereby allowing torsion spring 290 to carry the nut back to its original rotational position with respect to thrust plate 266 and the chuck body. Continued rotation of sleeve 214 moves the nut, thrust plate and jaws axially rearward and away from the tool shank.

Figure 12:
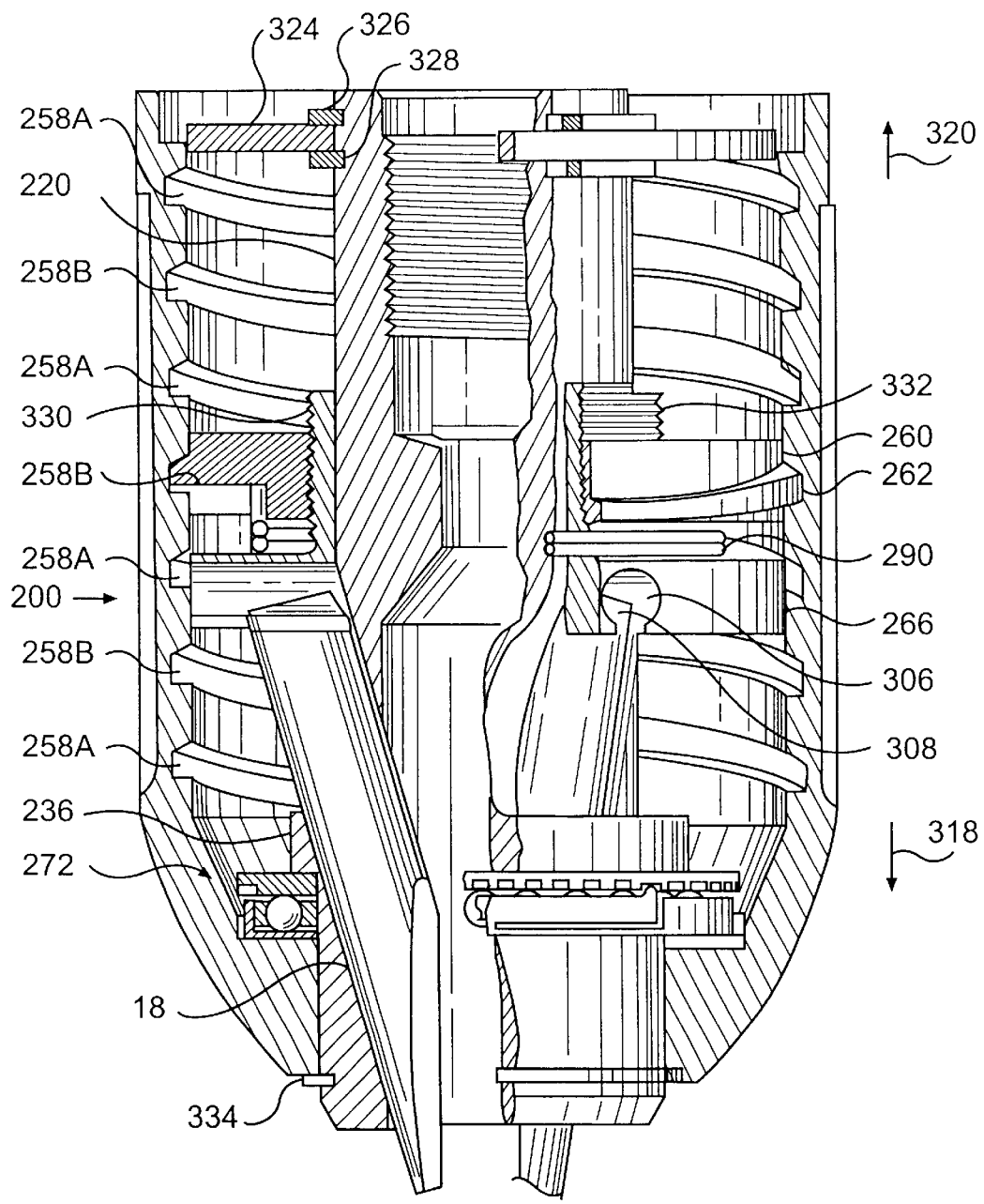
FIG. 12 is a plan view, partly in section, of a chuck in accordance with an embodiment of the present invention.
Figure 13:
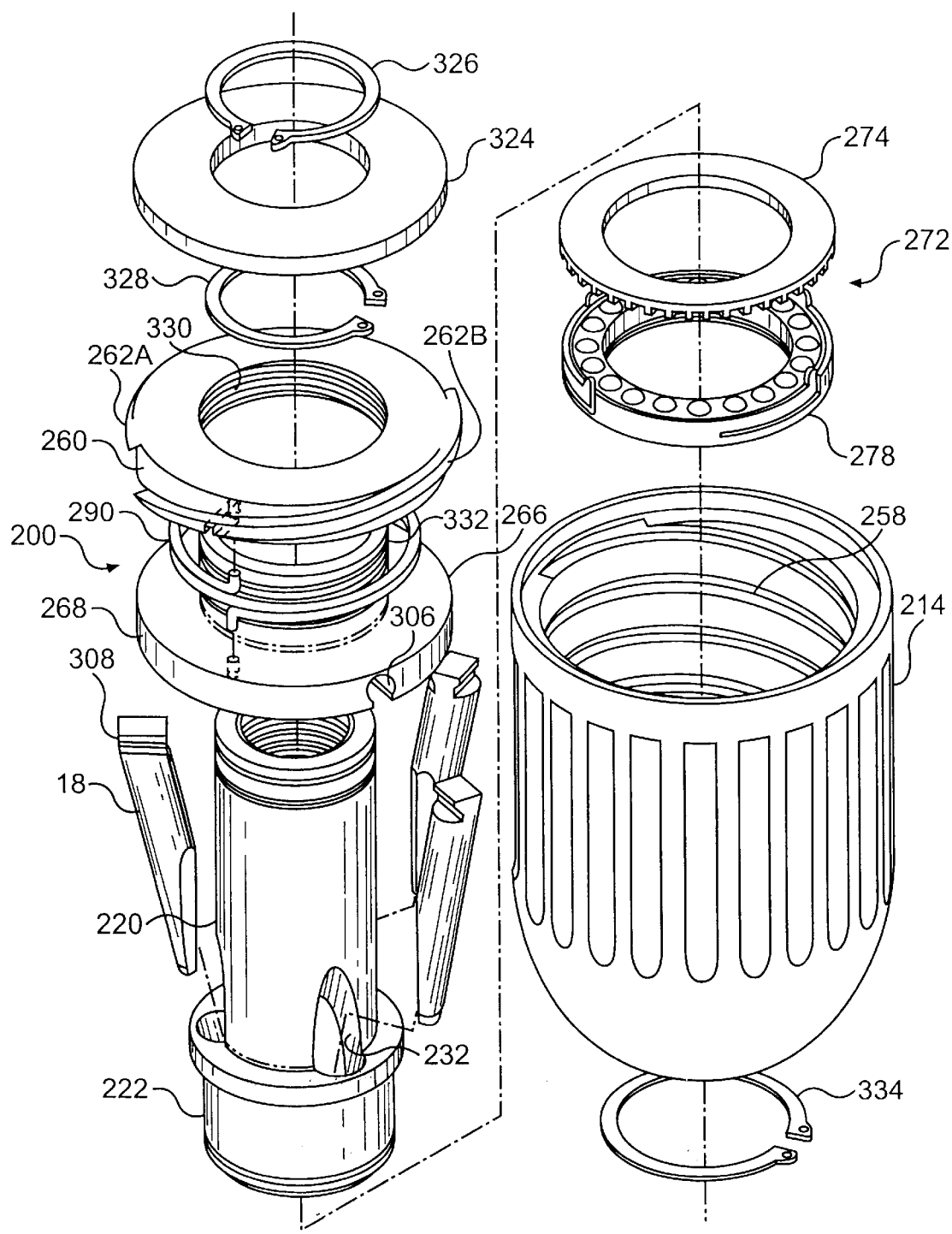
FIG. 13 is an exploded view of the chuck as in FIG. 12.

FIGS. 12 and 13 illustrate a further embodiment of chuck 200. The chuck is a single-sleeve chuck, and the outer surface of sleeve 214 extends to the rear of chuck body 220. A cover plate 324 is axially retained on body 220 by snap rings 326 and 328. Sleeve threads 312 and body threads 310 (FIG. 7) are replaced by threads 330 on the inner circumferential surface of nut 260 and threads 332 on the outer circumferential surface of the body portion of thrust plate 266. Bearing assembly 272 is disposed between sleeve 214 and body thrust ring 236. A snap ring 334 holds sleeve 214 in the axially forward direction on body 220.

In this embodiment, threads 258 and 262 are in an eight-pitch configuration. Nut 260 defines two threads 262A and 262B about its outer circumference. The inner surface of sleeve 214 defines two threads 258A and 258B that receive threads 262A and 262B, respectively. Threads 330 and 332 define a 32-pitch.

Friction between threads 258 and 262 is normally insufficient to overcome the force of torsion spring 290 keeping the nut and thrust plate rotationally together. Accordingly, when chuck 200 is between a fully opened and fully closed position, rotation of sleeve 214 in a clockwise direction (when viewed from the front of chuck 200) drives nut 260 axially forward with respect to sleeve 214 and body 220 in direction 318. Nut 260 is axially held to thrust plate 268 by threads 330 and 332. Thus, movement of nut 260 in direction 318 also moves thrust plate 266, thereby moving jaws 18 in passageways 232 toward the chuck axis.

When the jaws clamp onto a tool, jaws 18 exert a rearward force to sleeve 214 through thrust plate 266 and nut 260. Continued rotation of sleeve 214 wedges threads 258 and 262. Although a wedge also develops between threads 330 and 332, the rotational force applied to the nut by sleeve 214 is greater than the resistance provided by threads 330 and 332, due to the much lower pitch of threads 258 and 262.

The rotational force also overcomes the resistance of spring 290 (about 5 to 10 inch-lbs). Thus, nut 260 begins rotating with the sleeve on threads 332 against the spring.

Threads 330 have the same orientation as threads 258, and threads 332 have the same orientation as threads 262. Thus, rotation of nut 260 with sleeve 214 in the closing direction rotates the nut on threads 332 so that the nut and thrust plate move axially apart from each other. Since bearing assembly 272 and the body thrust ring prevent the sleeve and nut from moving rearwardly, this rotation forces thrust plate 266 axially forward, thereby further pressing jaws 18 down onto the tool shank. Continued rotation wedges threads 330 and 332. This wedge overcomes the force of torsion spring 290 so that, when an operator releases the sleeve, the chuck remains in the fully tightened position.

To open the chuck, the operator rotates sleeve 214 in the opening (counterclockwise) direction. This rotates nut 260 in the opening direction with respect to thrust plate 266, moving thrust plate 266, and therefore jaws 18, axially away from the tool shank. When the nut returns to its original rotational position on the thrust plate, further rotation of sleeve 214 moves the nut, thrust plate and jaws axially rearward, away from the tool.

Figure 2:
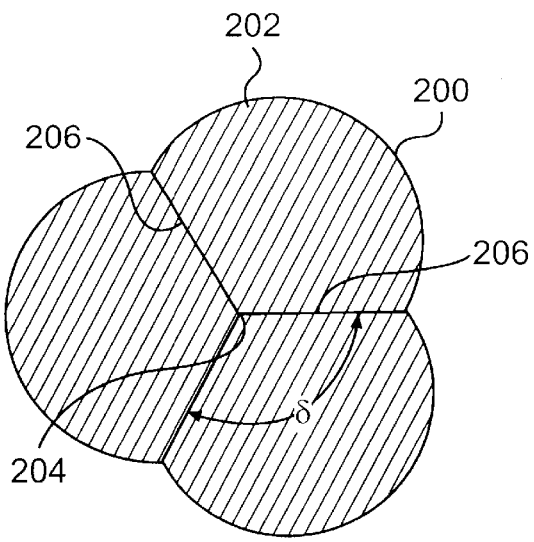
FIG. 2 is a cross-sectional view of prior art chuck jaws.

It should be understood that various jaw configurations, including the arrangement illustrated in FIG. 2, may be employed with the chucks of FIGS. 7–13.

While one or more preferred embodiments of the invention have been described above, it should be understood that any and all equivalent realizations of the present invention are included within the scope and spirit thereof. The embodiments depicted are presented by way of example only and are not intended as limitations upon the present invention. For example, while the sleeve in the embodiments illustrated in FIGS. 7–13 forms an exterior surface of the chuck, a chuck in accordance with the present invention could include a sleeve that is an interior component that rotates with respect to the body to drive the jaws. Thus, it should be understood by those of ordinary skill in this art that the present invention is not limited to these embodiments since modifications can be made. Therefore, it is contemplated that any and all such embodiments are included in the present invention as may fall within the literal and equivalent scope of the appended claims.

What is claimed is:

1. A chuck for use with a manual or powered driver having a rotatable drive shaft, said chuck comprising:

a generally, cylindrical body having nose section and a tail section said tail section being configured to rotate with said drive shaft and said nose section having an axial bore formed therein;

a plurality of jaws movably disposed with respect to said body to and away from said axial bore;

a generally cylindrical sleeve in driving communication with said jaws so that rotation of said sleeve with respect to said body in a closing direction moves said jaws toward said chuck axis and so that rotation of said sleeve with respect to said body in an opening direction moves said jaws away from said chuck axis;

a first set of interengaged threads operatively between said sleeve and said jaws by which said sleeve engages said jaws so that relative rotation between said first threads drives said jaws toward or away from said chuck axis; and a second set of interengaged threads operatively between said sleeve and said body by which said sleeve engages said body so that relative rotation between said second threads drives said jaws toward or away from said chuck axis, wherein said first thread set defines a first pitch so that when said jaws close, said first threads rotationally lock in said closing direction, and wherein said second thread set defines a second pitch that is higher than said first pitch so that when said jaws close, said second threads are relatively rotatable in said closing direction.

2. The chuck as in claim 1, wherein said sleeve defines an external surface of said chuck.

3. The chuck as in claim 2,
including a thrust plate axially movably disposed about said body in driving engagement with said jaws so that axial movement of said thrust plate with respect to said body moves said jaws toward and away from said chuck axis, depending on the axial direction ,of said movement,
including a nut axially fixed and rotationally restrained with respect to said thrust plate,
wherein said first threads are defined on an outer surface of said nut and an inner surface of said sleeve, and
wherein said second threads are defined on said sleeve and said body.

4. The chuck as in claim 3, wherein said second threads are formed on a forward portion of said sleeve and said nose section of said body.

5. The chuck as in claim 3, wherein said sleeve is constructed from a polymer material and includes a metallic insert on which threads of said second thread set are defined.

6. The chuck as in claim 5, wherein said metallic insert is pressed in said sleeve.

7. The chuck as in claim 1, wherein said first pitch is within a range of one to eight.

8. The chuck as in claim 1, wherein said second pitch is 32.

9. A chuck for use with a manual or powered driver having a rotatable drive shaft, said chuck comprising:
a generally cylindrical body having nose section and a tail section, said tail section being configured to rotate with said drive shaft and said nose section having an axial bore formed therein;
a plurality of jaws movably disposed with respect to said body to and away from said axial bore;
a thrust plate axially movably disposed about said body in driving engagement with said jaws so that axial movement of said thrust plate with respect to said body moves said jaws toward and away from said chuck axis, depending on the axial direction of said movement;
a nut axially fixed and rotationally restrained with respect to said thrust plate;
a generally cylindrical sleeve in driving communication with said jaws so that rotation of said sleeve with respect to said body in a closing direction moves said jaws toward said chuck axis and so that rotation of said sleeve with respect to said body in an opening direction moves said jaws away from said chuck axis, wherein said sleeve defines an external surface of said chuck;
a first set of interengaged threads defined on an outer surface of said nut and an inner surface of said sleeve and by which said sleeve engages said nut so that relative rotation between said first threads drives said jaws toward or away from said chuck axis; and
a second set of interengaged threads defined on said sleeve and said body and by which said sleeve engages said body so that relative rotation between said second threads drives said jaws toward or away from said chuck axis,
wherein said first thread set defines a first pitch so that when said jaws close, said first threads rotationally lock in said closing direction, and wherein said second thread set defines a second pitch that is higher than said first pitch so that when said jaws close, said second threads are relatively rotatable in said closing direction, and
wherein said nut is rotatable with respect to said thrust plate.

10. The chuck as in claim 9, including a spring attached to said nut and said thrust plate, said spring biasing against relative rotation between said nut and said thrust plate in said closing direction.

11. The chuck as in claim 10, wherein said nut is rotatable with respect to said thrust plate against said spring over a limited rotational range.

12. The chuck as in claim 10, wherein said nut defines a circumferential groove extending about an inner surface of said nut and wherein said thrust plate defines a stop that extends into said groove to limit rotation of said nut within said rotational range.

13. A chuck for use with a manual or powered driver having a rotatable drive shaft, said chuck comprising:
a generally cylindrical body having a nose section and a tail section, said tail section being configured to rotate with said drive shaft and said nose section having an axial bore formed therein;
a plurality of jaws movably disposed with respect to said body to and away from said axial bore;
a generally cylindrical sleeve in driving communication with said jaws so that rotation of said sleeve with respect to said body in a closing direction moves said jaws toward said chuck axis and so that rotation of said sleeve with respect to said body in an opening direction moves said jaws away from said chuck axis;
a generally cylindrical nut disposed operatively between said sleeve and said jaws;
a first set of interengaged threads operatively between said sleeve and said nut by which said sleeve engages said jaws so that relative rotation between said first threads drives said jaws toward or away from said chuck axis; and
a second set of interengaged threads operatively between said nut and said jaws by which said nut engages said jaws so that relative rotation between said second threads drives said jaws toward or away from said chuck axis,
wherein said first thread set defines a first pitch so that when said jaws close, said first threads rotationally lock in said closing direction, and wherein said second thread set defines a second pitch that is higher than said first pitch so that when said jaws close, said second threads are relatively rotatable in said closing direction.

14. The chuck as in claim 13,
including a thrust plate axially movably disposed about said body in driving engagement with said jaws so that axial movement of said thrust plate with respect to said body moves said jaws toward and away from said chuck axis, depending on the axial direction of said movement,
wherein said nut is disposed about said thrust plate,
wherein said first threads are defined on an outer surface of said nut and an inner surface of said sleeve, and wherein said second threads are defined on said nut and said thrust plate so that rotation of said nut with respect to said thrust plate on said second threads moves said nut axially with respect to said thrust plate.

15. The chuck as in claim 14, where said sleeve is axially fixed to said body.

16. The chuck as in claim 14, including a spring attached to said nut and said thrust plate, said spring biasing against relative rotation between said: nut and said thrust plate in said closing direction.

17. A chuck for use with a manual or powered driver having a rotatable drive shaft, said chuck comprising:
- a generally cylindrical body having a nose section and a tail section, said tail section being configured to rotate with said drive shaft and said nose section having an axial bore formed therein and a plurality of angularly disposed passageways formed therethrough and intersecting said axial bore;
- a plurality of jaws disposed in said passageways movably to and away from said axial bore;
- a generally cylindrical sleeve defining an external surface of said chuck, wherein said sleeve is in driving communication with said jaws so that rotation of said sleeve with respect to said body in a closing direction moves said jaws toward said chuck axis and so that rotation of said sleeve with respect to said body in an opening direction moves said jaws away from said chuck axis;
- a thrust plate axially movably disposed about said body in driving engagement with said jaws so that axial movement of said thrust plate with respect to said body moves said jaws toward and away from said chuck axis, depending on the axial direction of said movement;
- a nut axially fixed and rotatable with respect to said thrust plate;
- a spring attached to said nut and said thrust plate, said spring biasing against relative rotation between said nut and said thrust plate in said closing direction;
- a first set of interengaged threads defined on said nut and said sleeve so that relative rotation between said sleeve and said nut moves said nut and said thrust plate axially with respect to said body; and
- a second set of interengaged threads defined on said sleeve and said body so that relative rotation between said sleeve and said body moves said sleeve axially with respect to said body,
  - wherein said first thread set defines a first pitch so that when said jaws close, said sleeve and said nut rotationally lock in said closing direction, and
  - wherein said second thread set defines a second pitch that is higher than said first pitch so that when said jaws close, said sleeve and said body are relatively rotatable in said closing direction.

18. The chuck as in claim 17, including a bearing disposed operatively between said nut and said thrust plate.

19. The chuck as in claim 18, wherein said second threads are formed on a forward portion of said sleeve and said nose section of said body.

20. The chuck as in claim 17, wherein said nut is rotatable with respect to said thrust plate against said spring over a limited rotational range.

21. The chuck as in claim 17, wherein said first pitch is within a range of one to eight.

22. The chuck as in claim 17, wherein said second pitch is 32.

23. A chuck for use with a manual or powered driver having a rotatable drive shaft, said chuck comprising:
- a generally cylindrical body having a nose section and a tail section, said tail section being configured to rotate with said drive shaft and said nose section having an axial bore formed therein and a plurality of angularly disposed passageways formed therethrough and intersecting said axial bore;
- a plurality of jaws disposed in said passageways movably to and away from said axial bore;
- a generally cylindrical sleeve defining an external surface of said chuck, wherein said sleeve is in driving communication with said jaws so that rotation of said sleeve with respect to said body in a closing direction moves said jaws toward said chuck axis and so that rotation of said sleeve with respect to said body in an opening direction moves said jaws away from said chuck axis;
- a thrust plate axially movably disposed about said body in driving engagement with said jaws so that axial movement of said thrust plate with respect to said body moves said jaws toward and away from said chuck axis, depending on the axial direction of said movement;
- a nut disposed about said thrust plate;
- a spring attached to said nut and said thrust plate, said spring biasing against relative rotation between said nut and said thrust plate in said closing direction;
- a first set of interengaged threads defined on said nut and said sleeve so that relative rotation between said sleeve and said nut moves said nut and said thrust plate axially with respect to said body; and
- a second set of interengaged threads defined on said nut and said thrust plate so that rotation of said nut with respect to said thrust plate on said second threads moves said nut axially with respect to said thrust plate,
  - wherein said first thread set defines a first pitch so that when said jaws close, said sleeve and said nut rotationally lock in said closing direction, and
  - wherein said second thread set defines a second pitch that is higher than said first pitch so that when said jaws close, said sleeve and said body are relatively rotatable in said closing direction.

24. The chuck as in claim 23, including a bearing disposed operatively between said sleeve and said body.

25. The chuck as in claim 23, wherein said first pitch is within a range of one to eight.

26. The chuck as in claim 23, wherein said second pitch is 32.

27. A chuck for use with a manual or powered driver having a rotatable drive shaft, said chuck comprising:
- a generally cylindrical body having a nose section and a tail section, said tail section being configured to rotate with said drive shaft and said nose section having an axial bore formed therein;
- a plurality of jaws movably disposed with respect to said body to and away from said axial bore;
- a generally cylindrical sleeve in driving communication with said jaws so that rotation of said sleeve with respect to said body in a closing direction moves said jaws toward said chuck axis and so that rotation of said sleeve with respect to said body in an opening direction moves said jaws away from said chuck axis;
- a first set of interengaged threads by which said sleeve engages one of said body and said jaws so that relative rotation between said first threads drives said jaws toward or away from said chuck axis; and
- a second set of interengaged threads operatively between said sleeve and a nose section of said body by which said sleeve engages one of said body and said jaws so that relative rotation between said second threads drives said jaws toward or away from said chuck axis, wherein said first thread set defines a first pitch so that when said jaws close, said first threads rotationally lock in said closing direction, and wherein said second thread set defines a second pitch that is higher than said first pitch so that when said jaws close, said second threads are relatively rotatable in said closing direction.

* * * * *

UNITED STATES PATENT AND TRADEMARK OFFICE
CERTIFICATE OF CORRECTION

PATENT NO. : 6,428,018 B1  
DATED : August 6, 2002  
INVENTOR(S) : William H. Aultman and Robert A. Grogan It is certified that error appears in the above-identified patent and that said Letters Patent is hereby corrected as shown below:

<u>Column 4,</u>  
Line 49, please delete the number "6" and replace with the -- δ -- symbol.  
Line 54, after "side surfaces" please delete the word "is".

<u>Column 5,</u>  
Line 55, after "is" please delete the """.

<u>Column 13,</u>  
Line 15, after "direction" please delete the ",".

Signed and Sealed this

Twenty-first Day of June, 2005

JON W. DUDAS  
*Director of the United States Patent and Trademark Office*